United States Patent [19]

Davis

[11] Patent Number: 4,587,657

[45] Date of Patent: May 6, 1986

[54] SUPPRESSION OF HIGH-FREQUENCY ACOUSTIC WAVES IN E-BEAM LASERS

[75] Inventor: James A. Davis, Thousand Oaks, Calif.

[73] Assignee: Rockwell International Corporation, El Segundo, Calif.

[21] Appl. No.: 562,306

[22] Filed: Dec. 16, 1983

[51] Int. Cl.⁴ .............................................. H01S 3/09
[52] U.S. Cl. ....................................... 372/74; 372/55; 313/420
[58] Field of Search ........................ 372/74, 55, 33, 98, 372/28, 26, 103; 313/420

Primary Examiner—Léon Scott, Jr.
Attorney, Agent, or Firm—H. Fredrick Hamann; Harry B. Field; Lawrence N. Ginsberg

[57] ABSTRACT

High-frequency acoustic waves generated in the cavity 14 of an E-beam laser are suppressed by placing wedges 20 in the cavity. Each wedge 20 runs in alignment with and adjacent to a foil-support rib 12 so that the foil 10 lies between the rib 12 and the wedge 20. The wedges 20 are configured to fill the electron-shadow regions cast by the support ribs 12 and to efficiently scatter the acoustic waves so that they propagate longitudinally in the cavity 14 and can be absorbed by acoustic mufflers located upstream and downstream of the laser gas flow 16.

10 Claims, 1 Drawing Figure

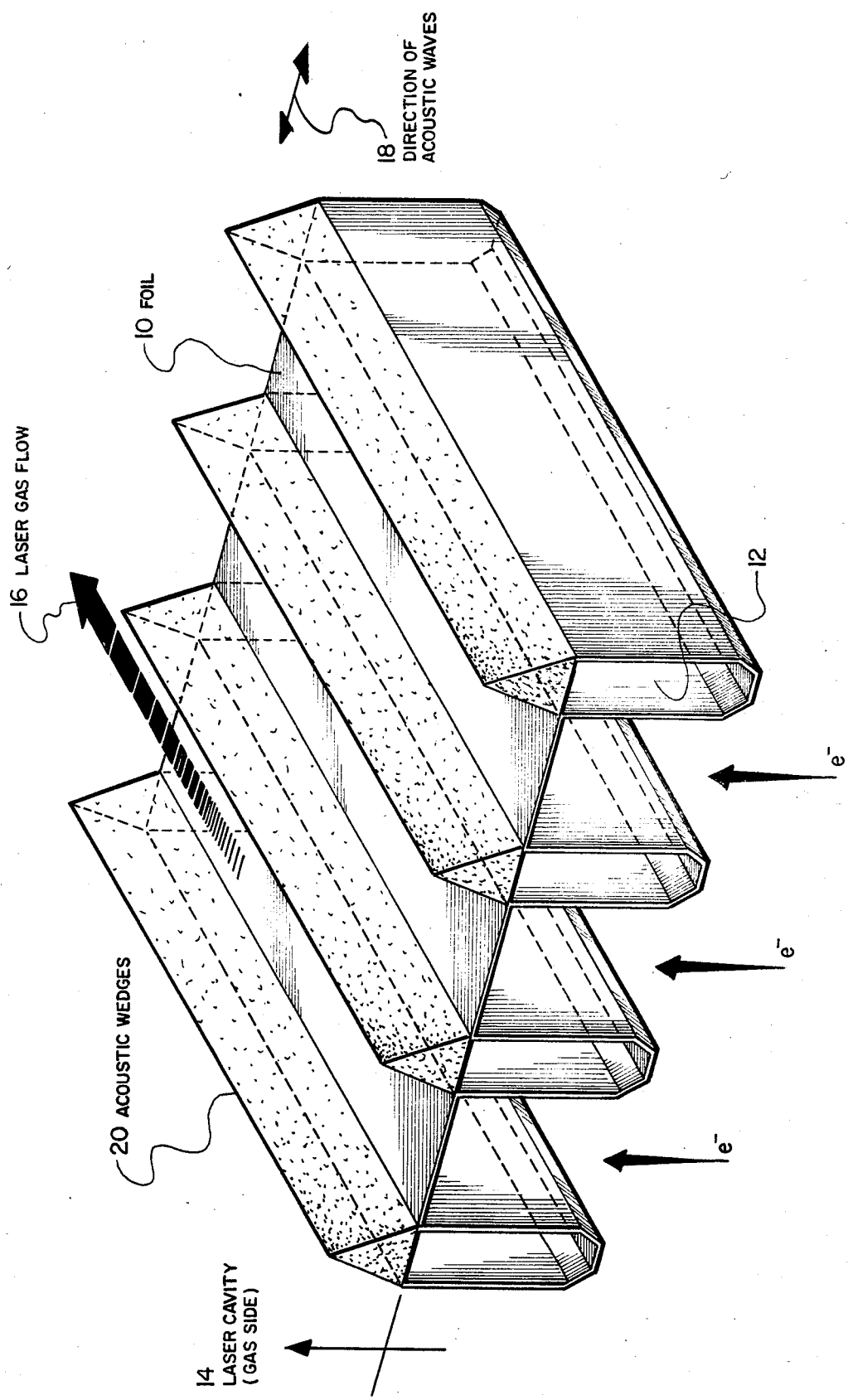

SUPPRESSION OF HIGH-FREQUENCY ACOUSTIC WAVES IN E-BEAM LASERS

BACKGROUND OF THE INVENTION

1. Field of the Invention

This invention relates to electron-beam (E-beam) lasers and especially to the suppression of high-frequency acoustic waves generated in E-beam lasers.

2. Description of the Prior Art

The non-uniform energy distribution pattern resulting from the shadow effect of the foil support ribs in E-beam-pumped, gas-laser cavities generates high-frequency acoustic waves transverse to the gas flow. Experimental data indicates that these acoustic waves persist within the cavity and affect the density and refractive index of the gaseous medium, thereby changing the optical path lengths of different portions of the laser beam. The unevenness of the optical path lengths reduces the quality of the laser by introducing an optical phase distortion in the coherent output beam. The influence of the acoustic waves is unacceptable for good optical homogeneity of the medium and the interpulse time interval has to be extended to allow the acoustic waves to attenuate sufficiently. This lowers the pulse repetition rate and effective output efficiency of the laser.

OBJECTS OF THE INVENTION

An object of the invention is to minimize production of acoustic waves in E-beam lasers.

Another object is to reduce the effects of acoustic waves in E-beam lasers.

A further object is to improve the output efficiency of E-beam lasers.

Other objects, advantages and novel features of the present invention will become apparent from the following detailed description of the invention when considered in conjunction with the accompanying drawing.

SUMMARY OF THE INVENTION

The objects and advantages of the present invention are achieved by placing wedges along the lengths of the foil-support ribs of an E-beam laser. The foil lies between the wedges and the ribs, the wedges being placed on the laser cavity side of the foil. The wedges are tapered toward the inside of the cavity and the height of the wedges should be no more than the thickness of the boundary layer of the gas in the cavity. The purpose of the wedges is to fill the volume of the E-beam shadow regions within the cavity and scatter the acoustic waves so that they can be absorbed by acoustic mufflers located upstream and downstream of the gas flow in the laser cavity.

BRIEF DESCRIPTION OF THE DRAWING

The single FIGURE is a partial isometric view showing the structure of a foil, its support ribs and wedges in accordance with the present invention.

DETAILED DESCRIPTION OF THE PREFERRED EMBODIMENTS

The FIGURE shows some of the supporting ribs 12 for the foil 10 used to vacuum-seal one side of the foil 10 from the laser cavity 14 of an E-beam laser. Electrons enter from below (as seen in the FIGURE). The direction of the laser gas flow within the laser cavity 14 is shown by the arrow 16; this is the longitudinal direction. The direction in which the acoustic waves propagate when they are generated is shown by the arrows 18; this is the transverse direction.

Wedges 20 are placed along and in alignment with the foil-support ribs 12 on the gas side 14 of the foil 10 in the direction of the gas flow. The height of the wedges 12 is no more than the nominal boundary-layer thickness in the cavity 14 so that the active gain region is not interfered with. The wedges 20 are designed to fill the shadow regions of the E-beams, i.e., the unheated gas volume. The wedges 20 are tapered and may have straight, convex, or concave sides. The taper is designed to provide for minimum electron shadow and maximum scattering of the acoustic waves. It is known that the trajectories of the electrons depend on the strength of the magnetic field used in the cavity, the electron energy and the properties of the foil. The taper and height of the wedges are designed to provide for optimum passage of electrons and minimum shadow region while still providing for good scattering of the acoustic waves. Scattering of the acoustic waves tends to turn the waves from transverse to longitudinal propagation so that acoustic mufflers placed at the upstream and downstream ends of the cavity 14 can absorb the acoustic energy.

The wedges 20 should be formed from material inert to the gaseous medium. A porous ceramic such as sintered alumina may be used for lasers utilizing corrosive gases such as fluorine- and chlorine-bearing compounds. The porous nature of the wedges also tends to absorb some of the acoustic energy. The material of the wedges should also tend to be heat-resistant because cavity temperature can be quite high and electrons injected into the cavity from the opposite side can deposit energy directly onto the wedges 20. The wedges 20 may be bonded in place by a suitable epoxy adhesive or the wedges 20 may be fabricated as portions of a frame in which the foil 10 is placed between the wedges 20 and the ribs 12.

The wedges 20 perform the dual functions of filling the shadow regions with a solid material to decrease the unheated gas volume (thereby decreasing the initial amplitude of the high-frequency acoustic waves) and of providing acoustic absorption and scattering to attenuate the post-pulse fluctuations. The wedges scatter the short-wavelength acoustic disturbances in the transverse and longitudinal directions so that acoustic mufflers upstream and downstream of the gas flow in the laser cavity can absorb the acoustic energy. The wedges also serve to suppress parasitic gain modes by absorbing spontaneous emissions of electromagnetic radiation (light) within the boundary layers.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In an E-beam-pumped gas laser of the type utilizing a foil to separate the gases in a laser cavity from a vacuum side of the foil, the vacuum side having a plurality of support ribs for supporting the foil against the pressure loads of the flowing laser gas, said support ribs casing electron-beam shadow areas, the improvement comprising:

means for suppressing acoustic waves generated in consequence of the electron-beam shadow areas, said means comprising a plurality of wedges, each wedge being positioned adjacent to and in alignment with an associated rib on the vacuum side of the foil so that the foil lies between each wedge and its associated support rib, and each wedge being shaped to occupy the electron-beam shadow area cast by its associated rib.

2. Suppression means as set forth in claim 1, wherein: each wedge has a height no more than a boundary-layer thickness of the gas flowing in the cavity.

3. Suppression means as set forth in claim 1, wherein: the wedges are formed of an acoustic-wave-suppressing material inert to the gas present in said gas laser.

4. Suppression means as set forth in claim 1, wherein: the wedges are formed from a porous material.

5. Suppression means as set forth in claim 1, wherein: the wedges are formed from a refractory material.

6. Suppression means as set forth in claim 1, wherein: the wedges are formed from a porous refractory material inert to the gas present in said gas laser.

7. Suppression means as set forth in claim 1, wherein: the wedges are tapered inwardly toward the laser cavity.

8. Suppression means as set forth in claim 1, wherein: the wedges are tapered inwardly toward the cavity so as to thereby provide an optimum combination of acoustic wave scattering and complete filling of the electron-beam shadow areas cast by said support ribs.

9. Suppression means as set forth in claim 1, wherein: each wedge has a height no greater than a boundary-layer thickness of the gas flowing in the cavity, and is formed from a porous material inert to the gas of the laser, and is tapered inwardly toward the cavity.

10. Suppression means as set forth in claim 9, wherein: the taper of each wedge is designed to provide an optimum combination of acoustic-wave scattering and complete filling of the electron-beam shadow areas cast by said support ribs.

* * * * *